United States Patent
Stahlberg et al.

(10) Patent No.: US 10,102,216 B2
(45) Date of Patent: Oct. 16, 2018

(54) SYSTEM FOR ASSOCIATING RELATED DIGITAL ASSETS

(71) Applicant: GOOGLE LLC, Mountain View, CA (US)

(72) Inventors: Patrick Stahlberg, Mountain View, CA (US); Umesh Shankar, Mountain View, CA (US); Robert Wilson Reeder, Mountain View, CA (US); Tzay-Yeu Wen, Mountain View, CA (US); Peter Williams, Mountain View, CA (US); Joseph Bonneau, San Francisco, CA (US)

(73) Assignee: Google LLC, Mountain View, CA (US)

( * ) Notice: Subject to any disclaimer, the term of this patent is extended or adjusted under 35 U.S.C. 154(b) by 608 days.

(21) Appl. No.: 14/691,921

(22) Filed: Apr. 21, 2015

(65) Prior Publication Data

US 2016/0314142 A1  Oct. 27, 2016

(51) Int. Cl.
*G06F 17/00* (2006.01)
*G06F 17/30* (2006.01)
*H04L 29/06* (2006.01)

(52) U.S. Cl.
CPC .... *G06F 17/30165* (2013.01); *G06F 17/3097* (2013.01); *G06F 17/30864* (2013.01); *H04L 63/08* (2013.01); *H04L 63/102* (2013.01)

(58) Field of Classification Search
CPC ......... G06F 17/30424; G06F 17/30165; G06F 17/30864
See application file for complete search history.

(56) References Cited

U.S. PATENT DOCUMENTS

| | | | |
|---|---|---|---|
| 7,415,439 B2* | 8/2008 | Kontio | G06F 21/10 705/51 |
| 8,892,601 B2 | 11/2014 | Greenberg et al. | |
| 2006/0179033 A1* | 8/2006 | Stanke | G06Q 30/02 |
| 2007/0067271 A1 | 3/2007 | Lu | |
| 2008/0304808 A1* | 12/2008 | Newell | G06F 17/30029 386/278 |

(Continued)

FOREIGN PATENT DOCUMENTS

WO  WO-2009027082 A1  3/2009

*Primary Examiner* — Cheryl Lewis
(74) *Attorney, Agent, or Firm* — Lerner, David, Littenberg, Krumholz & Mentlik, LLP (57) ABSTRACT

An association system for associating digital assets may include a processing device, a first computer-readable storage medium portion in communication with the processing device that includes an association database of statements regarding a set of digital assets and associations between the digital assets in the set, and a second computer-readable storage medium portion in communication with the electronic device. The second computer-readable storage medium portion may include one or more programming instructions that, when executed, cause the processing device to receive electronic data including a statement defining an association between a delegating digital asset and a receiving digital asset, verify whether the statement is reliable, and, in response to verifying that the statement is reliable, add an entry to the association database, and store in the entry an indication that the delegating digital asset grants the receiving digital asset the one or more characteristics.

29 Claims, 6 Drawing Sheets (56) References Cited

U.S. PATENT DOCUMENTS

| | | |
|---|---|---|
| 2012/0317624 A1 | 12/2012 | Monjas Llorente et al. |
| 2014/0095614 A1 | 4/2014 | Su et al. |
| 2014/0214640 A1* | 7/2014 | Mallikarjunan ....... G06Q 20/36 |
| | | 705/35 |
| 2015/0007269 A1 | 1/2015 | Brugger et al. |
| 2015/0356105 A1* | 12/2015 | Knutson ........... G06F 17/30091 |
| | | 707/624 |
| 2016/0323271 A1* | 11/2016 | Hinman ................ H04L 63/105 |

* cited by examiner

SYSTEM FOR ASSOCIATING RELATED DIGITAL ASSETS

BACKGROUND

It is often difficult to discern which digital assets belong together. For example, there is no general way to tell which social media page belongs to which website or which mobile application. This makes users who inadvertently or accidentally share their personal information with non-related assets susceptible to phishing or other attacks. In addition, it's often difficult to build a seamless user experience across different digital asset types.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, an association system for associating digital assets may include a processing device and a first computer-readable storage medium portion in communication with the processing device. The first computer-readable storage medium portion may include an association database of statements regarding a set of digital assets and associations between the digital assets in the set. The system may include a second computer-readable storage medium portion in communication with the electronic device. The second computer-readable storage medium portion may include one or more programming instructions that, when executed, cause the processing device to receive electronic data including a statement defining an association between a delegating digital asset and a receiving digital asset, where the association defines one or more characteristics that the delegating digital asset is able to delegate to the receiving digital asset. The second computer-readable storage medium portion may include one or more programming instructions that, when executed, cause the processing device to verify whether the statement is reliable by determining whether the statement was made by an asset owner of the delegating digital asset, and, in response to verifying that the statement is reliable, add an entry to the association database, and store in the entry an indication that the delegating digital asset grants the receiving digital asset the one or more characteristics.

In an embodiment, an association system for associating digital assets may include a processing device, a user interface, and a first computer-readable storage medium portion in communication with the processing device, where the first computer-readable storage medium portion includes an association database of statements regarding a set of digital assets and associations between the digital assets in the set. The system may include a second computer-readable storage medium portion in communication with the processing device that includes one or more programming instructions that, when executed, cause the processing device to receive, via the user interface, a request from a user pertaining to a first digital asset, query the association database using an indication of the first digital asset, receive from the association database an identification of one or more second digital assets that are associated with the first digital asset, generate a recommendation of one or more of the identified second digital assets, and cause the recommendation to be presented to the user via the user interface.

In an embodiment, an association system for associating digital assets may include a processing device and a first computer-readable storage medium portion in communication with the processing device. The first computer-readable storage medium portion may include an association database of statements regarding a set of digital assets and associations between the digital assets in the set. The system may include a second computer-readable storage medium portion in communication with the electronic device. The second computer-readable storage medium portion may include one or more programming instructions that, when executed, cause the processing device to receive a request on behalf of a first digital asset to utilize a characteristic belonging to a second digital asset and generate a query to ascertain whether the first digital asset and the second digital asset are associated such that the first digital asset possesses the characteristic. The query may include an indication of the first digital asset, an indication of the second digital asset, and an indication of the permission. The second computer-readable storage medium portion may include one or more programming instructions that, when executed, cause the processing device to query the association database using the generated query, receive, from the association database, an indication of whether the first digital asset and the second digital asset are associated for purposes of the characteristic, and in response to receiving an indication that the first digital asset and the second digital asset are associated, granting the request.

In an embodiment, a method of associating digital assets may include receiving electronic data comprising a statement defining an association between a delegating digital asset and a receiving digital asset, where the association defines one or more characteristics that the delegating digital asset is able to delegate to the receiving digital asset, verifying whether the statement is reliable by determining whether the statement was made by an asset owner of the delegating digital asset, and in response to verifying that the statement is reliable adding an entry to an association database, and storing in the entry an indication that the delegating digital asset grants the receiving digital asset the characteristics. The association database may include one or more statements regarding a set of digital assets and associations between the digital assets in the set.

In an embodiment, a method of associating digital assets may include receiving, via a user interface, a request from a user pertaining to a first digital asset, querying the association database using an indication of the first digital asset, receiving from an association database an identification of one or more second digital assets that are associated with the first digital asset, generating a recommendation of one or more of the identified second digital assets, and causing the recommendation to be presented to the user via the user interface. The association database may include one or more statements regarding a set of digital assets and associations between the digital assets in the set.

In an embodiment, a method of associating digital assets may include receiving a request on behalf of a first digital asset to utilize a characteristic belonging to a second digital asset and generating a query to ascertain whether the first digital asset and the second digital asset are associated such that the first digital asset possesses the characteristic. The query may include an indication of the first digital asset, an indication of the second digital asset, and an indication of the characteristic. The method may include querying an association database using the generated query, receiving, from the association database, an indication of whether the first digital asset and the second digital asset are associated for purposes of the characteristic, and in response to receiving an indication that the first digital asset and the second digital asset are associated, granting the request. The association database may include one or more statements regarding a set of digital assets and associations between the digital assets in the set.

DETAILED DESCRIPTION

The following terms shall have, for purposes of this application, the respective meanings set forth below:

An "association" refers to a relationship between or amongst digital assets such as, for example, one or more characteristics that are shared between or amongst digital assets.

A "characteristic" refers to a permission, a belief that one digital asset possesses about one or more other digital assets, an indication of a reputation or trustworthiness that one digital asset has for another digital asset and/or the like.

A "delegating digital asset" refers to a digital asset that delegates one or more of its characteristics to another digital asset.

A "digital asset" refers to an identifiable and addressable online asset that typically provides a service or content. Example digital assets include, without limitation, websites, mobile applications, social media feeds, and social media pages.

An "electronic device" refers to a device that includes a processor and non-transitory, computer-readable storage medium. The memory may contain programming instructions that, when executed by the processor, cause the electronic device to perform one or more operations according to the programming instructions. Examples of electronic devices include personal computers, servers, mainframes, gaming systems, televisions, and portable electronic devices such as smartphones, personal digital assistants, cameras, tablet computers, laptop computers, media players and the like. When used in the claims, reference to "an electronic device", "processor", or "processing device" may include a single device, or it may refer to any number of devices having one or more processors that communicate with each other and share data and/or instructions to perform the claimed steps. When used in the claims, reference to "memory" or "computer-readable storage medium" may include a single memory device or medium, or it may refer to any number of memory devices or computer-readable storage media.

A "permission" refers to an action that a digital asset is or is not permitted to perform and/or data that a digital asset is or is not allowed to access. Delegating a permission refers to a delegating digital asset granting or permitting one or more of its permission to a delegating digital asset.

A "receiving digital asset" refers to a digital asset that receives one or more characteristics of a delegating digital asset.

A "statement" refers to electronic information identifying one or more digital assets and defining one or more associations between or amongst the digital assets.

Figure 1:
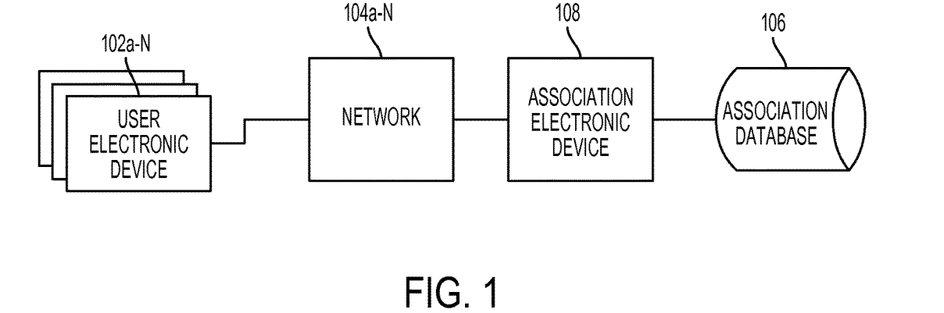
FIG. 1 illustrates an example association system for associating digital assets according to an embodiment.

FIG. 1 illustrates an example association system for associating digital assets according to an embodiment. As illustrated by FIG. 1, the system may include one or more user electronic devices 102a-N in communication with an association electronic device 108 via one or more communication networks 104a-N. An association electronic device 108 refers to an electronic device that is capable of querying, maintaining, accessing and/or otherwise using an association database.

A communication network 104a-N may be a local area network (LAN), a wide area network (WAN), a mobile or cellular communication network, an extranet, an intranet, the Internet and/or the like.

An association electronic device 108 may include or be in communication with an association database 106. An association database 106 is a dataset that contains information about one or more associations between or amongst digital assets as described in more detail below. For instance, an association database 106 may store one or more statements regarding a set of digital assets and associations between the digital assets in the set.

Figure 2:
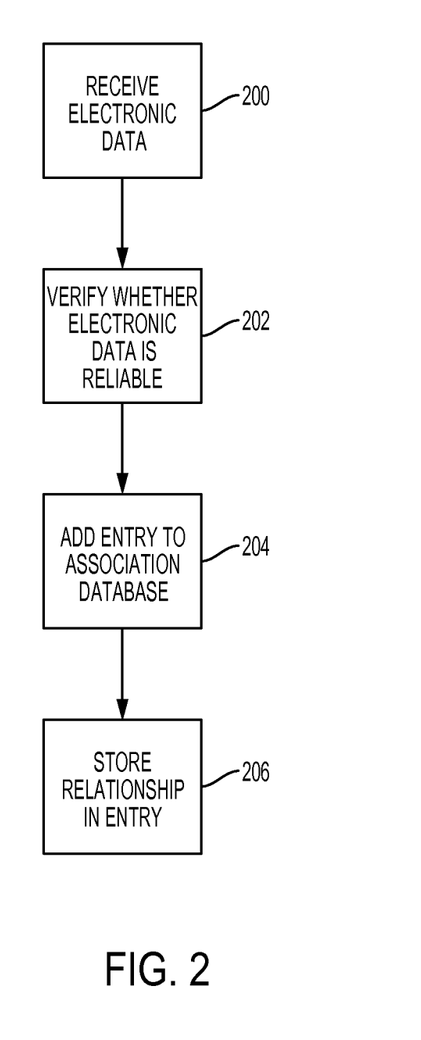
FIG. 2 illustrates a flow chart of an example method of associating digital assets according to an embodiment.

FIG. 2 illustrates a flow chart of an example method of associating digital assets according to an embodiment. As illustrated by FIG. 2, an association electronic device may receive 200 electronic data pertaining to an association between two or more digital assets. The received electronic data may include one or more statements about one or more associations between or amongst the digital assets. In an embodiment, an association refers to one or more characteristics that exist between or amongst digital assets. characteristic may include a permission, a belief that one digital asset possesses about one or more other digital assets, an indication of a reputation or trustworthiness that one digital asset has for another digital asset and/or the like. For instance, with respect to a pair of digital assets, an association between the digital assets in the pair may define one or more permissions that one digital asset is able to delegate to the other digital asset. As an example, an association electronic device may receive electronic data pertaining to an association between a website and a mobile application. The electronic data may include a statement that the website is able to delegate one or more of its permissions to the mobile application. In an embodiment, a delegating digital asset may only be able to delegate permissions that it possesses.

A permission may describe an action that a digital asset is permitted to perform or prohibited from performing and/or data that a digital asset is allowed to access or prohibited from accessing. Delegating a permission refers to a delegating digital asset allowing a receiving digital asset to perform an action specified by the permission on behalf of the delegating digital asset (or prohibiting a receiving digital asset from performing an action specified by the permission). For instance, an example permission may be for a delegating digital asset to handle certain uniform resource locators (URLs). The delegating digital asset may delegate this permission to a receiving digital asset which may allow the receiving digital asset to handle certain URLs on behalf of the delegating digital asset. In another embodiment, a permission may describe the sharing of certain information that a delegating digital asset is permitted to access. For instance, an example permission may be for a delegating digital asset to access user location information, login credentials or other information.

As an example, received electronic data may include one or more statements defining an association between digital assets. In some embodiments, a statement may define one or more characteristics that exist or do not exist between or amongst digital assets. For instance, a statement S (r, a, b) may be an assertion that the relation r holds for the ordered pair of digital assets (a,b). If r="delegates permission to view user's location", a=Mobile Application 1, b=Website 1, S (r, a, b) is an assertion that "Mobile Application 1 delegates its ability to use user's location to Website 1."

As another example, a statement may be a negative statement. For instance, in the example above, if r="does not delegate permission to access URLs", then S (r, a, b) is an assertion that "Mobile Application 1 does not delegate its ability to use user's location to Website 1."

In other embodiments, a statement may convey trust, reputation or one or more other characteristics between or amongst digital assets. For example, a statement may indicate a belief that a digital asset has regarding another digital asset such as, for example, "Mobile Application 1 believes Website 1 is trustworthy."

In various embodiments, an association electronic device may receive 200 electronic data pertaining to an association between two or more digital assets from one or more user electronic devices. For instance, creators or owners of digital assets may want to define statements between digital assets and send those statements to an association electronic device. An association electronic device may receive statements and other information from a variety of digital asset owners and may create or maintain a database, a list or other data structure of the statements. The database, list or other data structure may be accessible to one or more third parties such as, for example, users who may want to verify which digital assets are truly related to one another.

Referring back to FIG. 2, an association electronic device may verify 202 whether received electronic data is reliable. In certain embodiments, an association electronic device may verify 202 whether electronic information is reliable by determining whether such information was provided by an owner of the digital asset delegating one or more of its characteristics. For instance, a statement concerning digital assets may be verified if the statement was made by the owner of the digital asset delegating one or more of its characteristics. Referring back to the above example, an association electronic device may receive the statement indicating that Mobile Application 1 delegates its ability to use the user's location to Website 1. An association electronic device may verify 202 this statement by determining whether it was made by the owner of Mobile Application 1.

In various embodiments, an association electronic device may determine whether a statement was made by an owner of a particular digital asset by determining an asset type associated with the delegating digital asset. An asset type refers to a category, characterization of or function associated with a digital asset such as, for example, a website, mobile application and/or the like. Statements made by owners of different asset types may be provided in different manners. As such, it may be important to identify a pertinent asset type of a digital asset in determining whether statements about that digital asset are reliable.

In certain embodiments, an association electronic device may determine an asset type of a delegating digital asset based on received electronic data. For instance, an association electronic device may receive electronic data that indicates an asset type associated with one or more delegating digital assets.

An association electronic device may use a determined asset type to determine whether a received statement about a delegating digital asset is reliable. In an embodiment, an association electronic device may maintain or be in communication with a database or other data structure containing asset types and corresponding locations of where authorized statements can be found for that asset type. For instance, as mentioned above, a statement made by the owner of a website may only be made in a file corresponding to the website that only the owner can access. For example, for website <scheme>://<domain>:<port>/, the file at <scheme>://<domain>:<port>/.well-known/associations.json may contain a JavaScript Object Notation (JSON) list of owner-only statements.

As another example, a statement about a mobile application may be included in data that has been electronically signed by the application developer. For instance, the data may include a mobile application manifest for the application that is protected by a package signature whose signing key is by definition controlled by the owner of the application.

After identifying an appropriate asset type, an association electronic device may determine the corresponding location of where authorized statements can be found for that asset type. An association electronic device may determine whether the received statement is present in the authorized location. For instance, if received electronic data indicates that a delegating digital asset is a website, an association electronic device may determine whether a statement originating from the website is present in a JSON list of statements included in the received electronic data. As another example, if received electronic data indicates that a digital asset is a mobile application, an association electronic device may determine whether a statement originating from the application is present in a mobile application manifest for the application included in the received electronic data.

As discussed above, in some embodiments, one or more statements about a digital asset may be included in a location associated with the digital asset, such as, for example, a file associated with the digital asset. In other embodiments, one or more asset owners may delegate their statement-making privileges to a central location such as, for example, one or more files. As described in this disclosure, asset owners may publish lists of statements in a way that allows third parties to verify the authenticity of the statements. However, this can become burdensome to the asset owners if they own many different digital assets that make statements about the other digital assets in the group. For example, a website www.website.de may want to delegate permissions to www.website.fr and all other related country domains and vice versa. To do so, each per-country domain would need to be changed to add the new statements.

To simplify, an asset owner may delegate its statement-making privileges to a central location which may be associated with one or more of the asset owner's digital assets. In an embodiment, a central location may be specific to a particular asset. For instance, in the above example, each per-country domain may make a statement that all of its applicable statements are located in a file located at www.website.com/all-of-websitesstatements. In this situation, adding a new per-country domain is simplified as only one the central location needs to be updated to reflect the new per-country domain. Although per-country domains are used as an example, it is understood that other related digital assets may be used within the scope of this disclosure.

In an embodiment, an asset owner may delegate its statement-making privileges to a central location across one or more asset types. For instance, a mobile application may reference a central location, such as a file, on a website. Additional and/or alternate combinations of digital assets and/or digital asset types may be used within the scope of this disclosure.

In certain embodiments, received electronic data may include a reference to a central location. reference may be an address or other identifier associated with a central location where one or more statements may be found. In some embodiments, an asset owner may control the central location. For instance, an asset owner may be able to edit information contained at a central location. In other embodiments, an asset owner may not control the central location. But, by referencing the central location with respect to a digital asset, the asset owner may be conveying that it trusts whomever does control the central location. As such, a central location may be a mechanism by which an asset owner may extend trust to another party. In an embodiment, an association electronic device may access one or more statements by following or accessing the reference.

In an embodiment, an association electronic device may maintain or be in communication with a database or other data structure containing an indication of one or more asset owners, digital assets and/or a central location associated with the one or more of the asset owner and digital asset. For example, an association electronic device may keep a record of central locations referenced by one or more asset owners, asset types, digital assets and/or the like.

If an association electronic device determines that the electronic data includes statements in determined locations, the association electronic device may verify 202 the statement. Otherwise, the association electronic device may not verify the statement.

In some embodiments, an association electronic device may verify 202 a statement by determining whether it was made by the owner of a digital asset by determining whether at least a portion of the received electronic data, such as, for example, a statement, is signed using a secret that verifiably only the asset owner knows. Public-key cryptography may be used as part of this verification process. For example, an association electronic device may determine whether a statement associated with a mobile application was signed using a private signing key of the mobile application. As another example, an association electronic device may determine whether a statement associated with a website was signed using a private key of an HTTPS website. If the association electronic device determines that a statement was signed using data that is only accessible to the asset owner, the association electronic device may verify 202 the statement. Otherwise, the association electronic device may not verify the statement.

In an embodiment, if an association electronic device determines that at least a portion of the received electronic data is signed using a secret that only the asset owner knows, the association electronic device may verify 202 the statement. Otherwise, the association electronic device may not verify the statement.

In an embodiment, if an association electronic device verifies that the statement is reliable, the association electronic device may add 204 an entry to an association database. An association database may be a database, list or other data structure used to store association information for one or more digital assets. An association database may store an indication of each digital asset for which an association exists, an indication of the association, an indication of one or more characteristics that are delegated by virtue of the association and/or the like.

In some embodiments, an association database may be stored or maintained by an association electronic device. In other embodiments, an association database may be located remotely from an association electronic device, but accessible by the association electronic device such as, via a network.

In an embodiment, an association database may store 206 in the added entry an indication of the association between the delegating digital asset and the receiving digital asset that are the subject of the received statement. For instance, an indication of one or more characteristics that a delegating digital asset grants to a receiving digital asset may be stored. Table 1 illustrates an example entry of an example association database according to an embodiment.

TABLE 1

| Delegating Digital Asset | Receiving Digital Asset | Characteristic |
| --- | --- | --- |
| Website 1 | Mobile Application 1 | View user's location |

Figure 3:
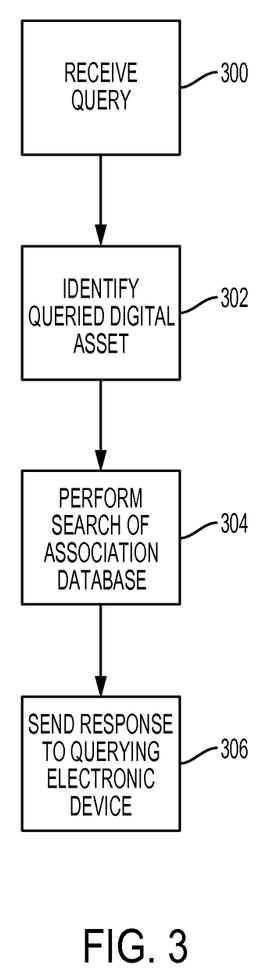
FIG. 3 illustrates an example method of querying an association database according to an embodiment.

In various embodiments, the association database may be accessible and searchable to one or more users. FIG. 3 illustrates an example method of querying an association database according to an embodiment. As illustrated by FIG. 3, an electronic device associated with or in communication with an association database such as, for example, an association electronic device, may receive 300 a query. An electronic device may receive 300 a query from a user electronic device. The query may include an indication of a digital asset to be searched such as, for example, a name, an address or other identifier associated with the digital asset. For instance, a user may want to know what digital assets are related to a particular website. The corresponding query may include an indication of the website such as, for instance, a corresponding URL.

An electronic device may identify 302 the queried digital asset from the query, and may perform 304 a search of an association database for the queried digital asset. In situations where the association database is located remotely from the electronic device, the electronic device may send a query or other request pertaining to the queried digital assets. In response, the electronic device may receive from the association database an indication of whether one or more other digital assets are related to the queried digital assets. In some embodiments, the response from the association database may include an indication of one or more digital assets that are related to the queried digital assets such as, for instance, a name, an address or other identifier.

In embodiments where an electronic device includes an association database, the electronic device may query the association database to determine an indication of one or more digital assets that are related to the queried digital assets such as, for instance, a name, an address or other identifier.

For instance, a user may send a query to an electronic device asking what digital assets are related to Website 1 as illustrated by Table 1. The electronic device may query an association database and determine that Mobile Application 1 is related to Website 1.

In an embodiment, an electronic device may send 306 a response to the querying user electronic device. The response may include an indication of one or more identified related digital assets. For instance, referring to the above example, the electronic device may return a response to a user electronic device that includes an indication that Mobile Application 1 is related to Website 1. In certain embodiments, if no related digital assets are identified, an electronic device may send a response to a querying user electronic device indicating that no results were found.

Figure 4:
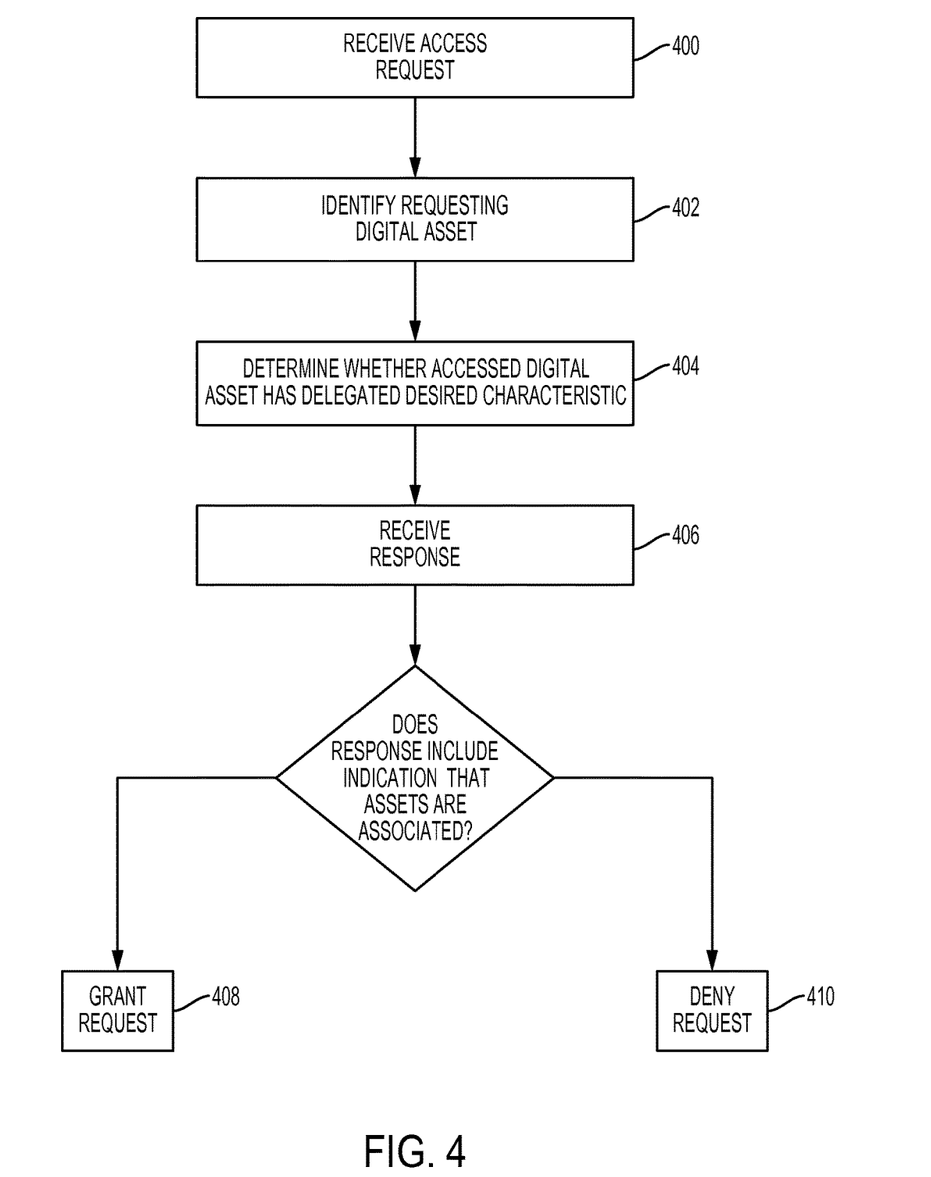
FIG. 4 illustrates an example method of processing requests on behalf of a digital asset according to an embodiment.

In an embodiment, an electronic device such as, for example, an association electronic device may process requests on behalf of a digital asset that is requesting one or more permissions of one or more other digital assets. FIG. 4 illustrates an example method of processing these requests according to an embodiment.

As illustrated by FIG. 4, an electronic device may receive 400 an access request. The access request may be received 400 from one or more other electronic devices on behalf of a requesting digital asset. The access request may include an indication of the requesting digital asset, an indication of the accessed digital asset and an indication of the desired characteristic. An accessed digital asset may refer to a digital asset whose characteristic(s) a requesting digital asset is requesting access to.

An electronic device may identify 402 the requesting digital asset, the accessed digital asset and the desired characteristic from the request. The electronic device may determine 404 whether the accessed digital asset has delegated the desired characteristic to the requesting digital asset. An electronic device may determine 404 whether the accessed digital asset has delegated the desired characteristic to the requesting digital asset by generating a query of an association database. The query may include an indication of the requesting digital asset, an indication of the accessed digital asset, and an indication of the characteristic. The electronic device may query the association database using the generated query.

For instance, referring back to Table 1, an electronic device may receive a request from Mobile Application 1 to view a user's location that is accessible to Website 1. The electronic device may generate a query to perform a search of an association database to determine whether Website 1 has delegated the ability to view user locations to Mobile Application 1.

In an embodiment, an electronic device may receive 406 an indication of whether the requesting digital asset and the accessed digital asset are associated for purposes of the permission from the association database. In response to receiving an indication that the requesting digital asset and the accessed digital asset are associated, the electronic device may grant 408 the request. Otherwise, the electronic device may deny 410 the request.

Figure 5:
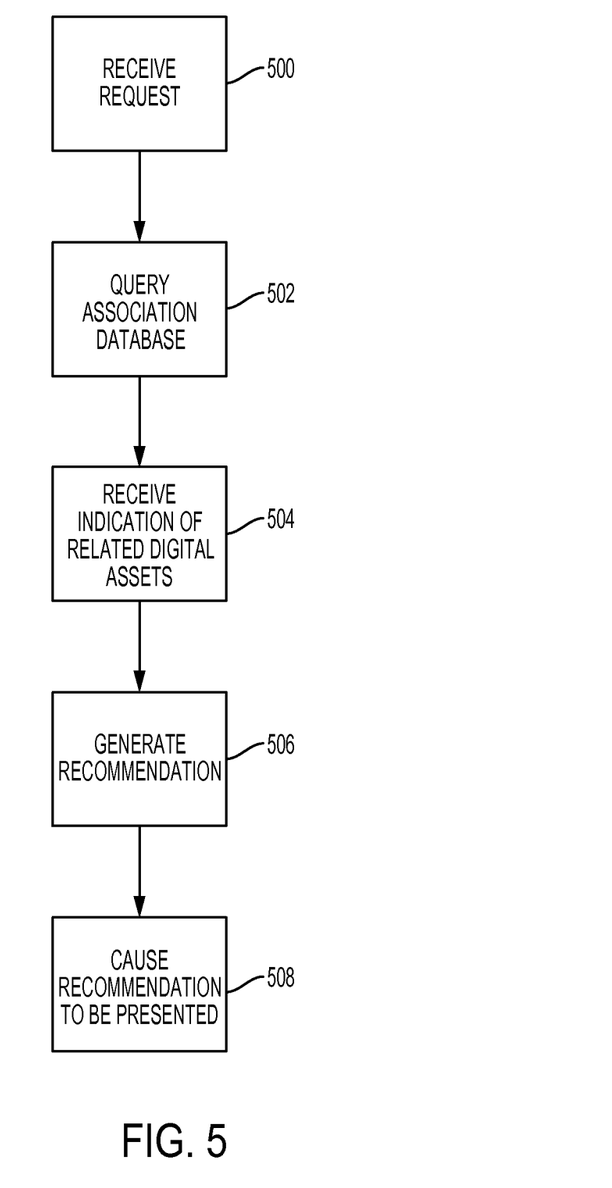
FIG. 5 illustrates an example method of generating a digital asset recommendation for a user according to an embodiment.

In certain embodiments, an association database may be used to make digital asset recommendations to a user. For instance, an electronic device may inform a user of a particular digital asset of the existence of one or more related digital assets. FIG. 5 illustrates an example method of generating a digital asset recommendation for a user according to an embodiment. As illustrated by FIG. 5, an electronic device may receive 500 a request from a user pertaining to a particular digital asset. In an embodiment, the request may be a request to access a certain digital asset. For instance, a request may include selecting an icon or other representation of a digital asset such as, for example, an icon associated with a mobile application. As another example, a request may involve providing an address or other identifier associated with a digital asset. For instance, a request may include entering a URL in an address bar of a browser.

In an embodiment, a request may involve performing a search for a particular digital asset. For instance, a user may perform a search for a digital asset using a search engine or other search capability. As an example, a user may search for "Mobile Application 1" using a search engine.

In various embodiments, the electronic device may identify 500 a digital asset from the received request. For instance, if a request is to access a particular digital asset, an electronic device may identify the digital asset from the request. Likewise, if the request involves a search for a particular digital asset, an electronic device may identify the digital asset that is being searched for.

An electronic device may query 502 an association database for the identified digital asset. In certain embodiments, an electronic device may query an association database in the manner described above with respect to FIG. 3.

An electronic device may receive 504 from an association database, or determine via an association database, an indication of one or more related digital assets that are associated with the identified digital asset. The indication may include a name, an address or other identifier associated with the related digital assets.

In an embodiment, an electronic device may generate 506 a recommendation of one or more of the related digital assets. An electronic device may generate 506 a recommendation by generating a notification, an email, a text message, an advertisement or other alert. The recommendation may include an indication of one or more related digital assets and an indication that the one or more related digital assets are related to the identified digital asset.

In an embodiment, an electronic device may cause 508 the recommendation to be presented to the user such as, for example, via a user interface of an electronic device. For instance, if a user searches for Vendor 1's mobile application via a search engine, one of the search results may be a notification identifying Vendor 1's social media page and website. As another example, a user may select Vendor 1's mobile application to install on the user's mobile electronic device. The mobile electronic device may display an alert notification to the user informing the user that the user may also want to visit Vendor 1's social media account and identifying the social media account with a hyperlink, an icon, an address or other representation.

Figure 6:
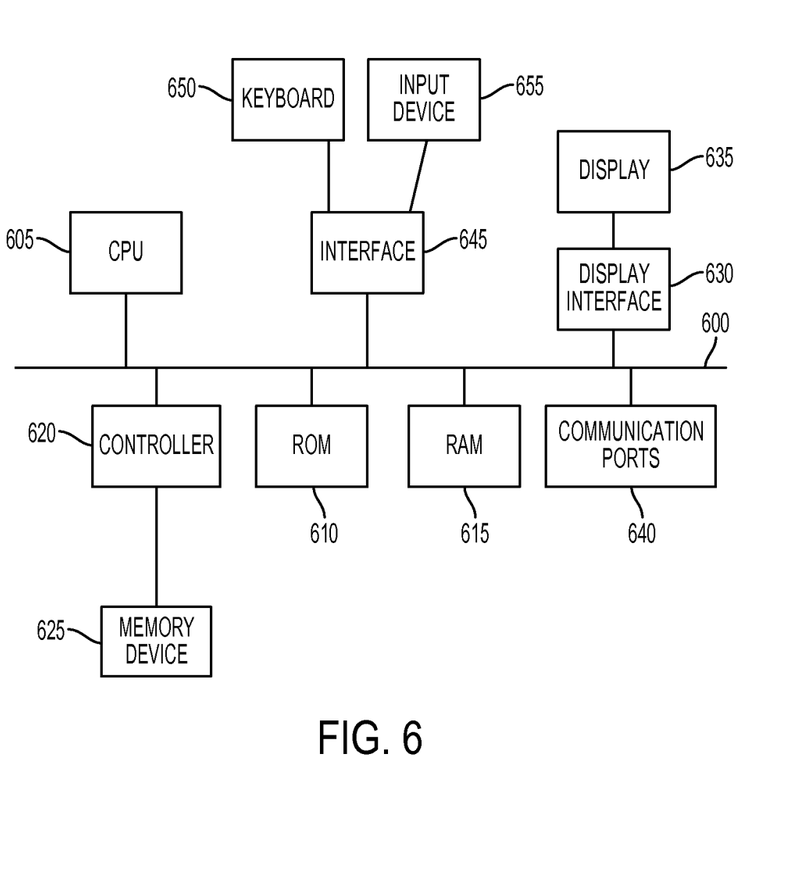
FIG. 6 illustrates a block diagram of example hardware that may be used to contain or implement program instructions according to an embodiment.

FIG. 6 depicts a block diagram of hardware that may be used to contain or implement program instructions. bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an example of a production device, computing device or processor as such terms are used within this disclosure. Read only memory (ROM) 610 and random access memory (RAM) 615 constitute examples of non-transitory computer-readable storage media.

A controller 620 interfaces with one or more optional non-transitory computer-readable storage media 625 to the system bus 600. These storage media 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible, non-transitory computer-readable medium such as a compact disk, a digital disk, flash memory, a memory card, a USB drive, an optical disc storage medium and/or other recording medium.

An optional display interface 630 may permit information from the bus 600 to be displayed on the display 635 in audio, visual, graphic or alphanumeric format. Communication with external devices, such as a printing device, may occur using various communication ports 640. communication port 640 may be attached to a communication network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. An association system for associating digital assets, the system comprising:
   a processing device;
   a first computer-readable storage medium portion in communication with the processing device, the first computer-readable storage medium portion comprising an association database of statements regarding a set of digital assets and associations between the digital assets in the set, wherein the association database is accessible to one or more third parties to verify one or more of the associations between the digital assets in the set, and wherein the digital assets are online assets that provide a service or content;
   a second computer-readable storage medium portion in communication with the electronic device, wherein the second computer-readable storage medium portion comprises one or more programming instructions that, when executed, cause the processing device to:
      receive electronic data comprising a statement, the statement being electronic information defining an association between a delegating digital asset and a receiving digital asset, wherein the association defines one or more characteristics that the delegating digital asset is able to delegate to the receiving digital asset,
      determine whether the statement was made by an asset owner of the delegating digital asset by:
         determining an asset type associated with the delegating digital asset, wherein the asset type categorizes the service or content provided by the delegating digital asset,
         determining, based on the determined asset type, a permissible location for authorized statements that are made by the asset owner regarding the delegating digital asset, wherein the permissible location is in the received electronic data or in a central location referenced in the received electronic data, and
         determining whether the statement is located in the permissible location, and
      verify the statement when the statement was made by the asset owner of the delegating digital asset, wherein verifying the statement comprises:
         adding an entry to the association database, and
         storing in the entry an indication that the delegating digital asset grants the receiving digital asset the one or more characteristics;
      not verify the statement when the statement was not made by the asset owner of the delegating digital asset.

2. The system of claim 1, wherein the one or more programming instructions that, when executed, cause the processing device to determine whether the statement was made by an asset owner of the delegating digital asset comprises one or more programming instructions that, when executed, cause the processing device to determine whether the statement is located in a location that can only be controlled by the asset owner.

3. The system of claim 2, wherein the first digital asset comprises a website and the location comprises an access-controlled electronic file.

4. The system of claim 1, wherein:
   the first digital asset comprises a mobile application; and
   the one or more programming instructions that, when executed, cause the processing device to determine whether the statement was made by an asset owner of the delegating digital asset comprises one or more programming instructions that, when executed, cause the processing device to determine whether the statement is signed using a key that only the asset owner has access to.

5. The system of claim 1, wherein the one or more programming instructions that, when executed, cause the processing device to verify whether the statement is reliable by determining whether the statement was made by an asset owner of the delegating digital asset comprise one or more programming instructions that, when executed, cause the processing device to determine whether the statement is signed using a key that only the asset owner has access to.

6. The system of claim 1, wherein the one or more programming instructions that, when executed, cause the processing device to verify whether the statement is reliable by determining whether the statement was made by an asset owner of the delegating digital asset comprise one or more programming instructions that, when executed, cause the processing device to determine whether the statement is located in a central location associated with the asset owner, wherein the central location comprises one or more statements about one or more other digital assets owned by the asset owner.

7. The system of claim 1, wherein the one or more characteristics comprise one or more of the following:
   an ability to receive one or more login credentials associated with the delegating digital asset;

an ability to handle one or more uniform resource locators that the delegating digital asset handles; and an ability to receive the user's location.

8. The system of claim 1, wherein:

the delegating digital asset is a website, and the permissible location is a JavaScript Object Notation list that is included in the received electronic data.

9. The system of claim 1, wherein:

the delegating digital asset is a mobile application, and the permissible location is a mobile application manifest for the mobile application that is included in the received electronic data.

10. An association system for associating digital assets, the system comprising:

a processing device;

a user interface;

a first computer-readable storage medium portion in communication with the processing device, the first computer-readable storage medium portion comprising an association database of statements, the statements being electronic information regarding a set of digital assets and associations between the digital assets in the set, wherein the statements were verified to be made by one or more asset owners of the set of digital assets based on asset types of the digital assets and permissible locations of the statements, wherein the digital assets are online assets that provide a service or content, and wherein the association database is accessible to one or more third parties to verify one or more of the associations between the digital assets in the set;

a second computer-readable storage medium portion in communication with the processing device, the second computer-readable storage medium portion comprising one or more programming instructions that, when executed, cause the processing device to:

receive, via the user interface, a request from a user pertaining to a first digital asset, query the association database using an indication of the first digital asset, the indication is based on one of the statements that was verified to be made by an asset owner of the first digital asset, receive from the association database an identification of one or more second digital assets that are associated with the first digital asset, generate a recommendation of one or more of the identified second digital assets, and cause the recommendation to be presented to the user via the user interface.

11. The system of claim 10, wherein the one or more programming instructions that, when executed, cause the processing device to receive a request from a user pertaining to a first digital asset comprise one or more programming instructions that, when executed, cause the processing device to perform one or more of the following:

receive a selection of the first digital asset;

receive a query pertaining to the first digital asset; and receive an identifier associated with the first digital asset.

12. The system of claim 10, wherein the one or more programming instructions that, when executed, cause the processing device to generate a recommendation of one or more of the identified second digital assets comprise one or more programming instructions that, when executed, cause the processing device to generate a notification that includes an indication of one or more of the identified second digital assets.

13. The system of claim 10, wherein:

the one or more programming instructions that, when executed, cause the processing device to receive a request from a user pertaining to a first digital asset comprise one or more programming instructions that, when executed, cause the processing device to receive a query pertaining to the first digital asset via a search engine;

the one or more programming instructions that, when executed, cause the processing device to cause the recommendation to be presented to the user via the user interface comprise one or more programming instructions that, when executed, cause the processing device to display the recommendation as part of one or more search results of the search engine.

14. The system of claim 10, wherein the one or more programming instructions that, when executed, cause the processing device to cause the recommendation to be presented to the user via the user interface comprise one or more programming instructions that, when executed, cause the processing device to perform one or more of the following:

cause an electronic message comprising the recommendation to be sent to the user;

cause an alert comprising the recommendation to be displayed via the user interface; and cause a text message comprising the recommendation to be sent to the user.

15. An association system for associating digital assets, the system comprising:

a processing device;

a first computer-readable storage medium portion in communication with the processing device, the first computer-readable storage medium portion comprising an association database of statements, the statements being electronic information regarding a set of digital assets and associations between the digital assets in the set, wherein the statements were verified to be made by one or more asset owners of the set of digital assets based on asset types of the digital assets and permissible locations of the statements, wherein the digital assets are online assets that provide a service or content, and wherein the association database is accessible to one or more third parties to verify one or more of the associations between the digital assets in the set;

a second computer-readable storage medium portion in communication with the electronic device, wherein the second computer-readable storage medium portion comprises one or more programming instructions that, when executed, cause the processing device to:

receive a request on behalf of a first digital asset to utilize a characteristic belonging to a second digital asset, generate a query to ascertain whether the first digital asset and the second digital asset are associated such that the first digital asset possesses the characteristic, wherein the query comprises an indication of the first digital asset, an indication of the second digital asset, and an indication of the permission, query the association database using the generated query, receive, from the association database, an indication of whether the first digital asset and the second digital asset are associated for purposes of the characteristic, and in response to receiving an indication that the first digital asset and the second digital asset are associated, granting the request, wherein the indication is based on one of the statements that was verified to be made by an asset owner of the first digital asset, in response to receiving an indication that the first digital asset and the second digital asset are not associated, denying the request.

16. The system of claim 15, wherein the permission comprises one or more of the following:
an ability to receive one or more login credentials associated with the second digital asset;
an ability to handle one or more uniform resource locators that the second digital asset handles; and
an ability to receive the user's location.

17. A method of associating digital assets, the method comprising:
receiving electronic data comprising a statement, the statement being electronic information defining an association between a delegating digital asset and a receiving digital asset, wherein the association defines one or more characteristics that the delegating digital asset is able to delegate to the receiving digital asset, and wherein the digital assets are online assets that provide a service or content;
determining whether the statement was made by an asset owner of the delegating digital asset by:
determining an asset type associated with the delegating digital asset, wherein the asset type categorizes the service or content provided by the delegating digital asset,
determining, based on the determined asset type, a permissible location for authorized statements that are made by the asset owner regarding the delegating digital asset wherein the permissible location is in the received electronic data or in a central location referenced in the received electronic data, and
determining whether the statement is located in the permissible location, and
verifying the statement when the statement was made by the asset owner of the delegating digital asset, wherein verifying the statement comprises:
adding an entry to an association database, and
storing in the entry an indication that the delegating digital asset grants the receiving digital asset the characteristics,
not verifying the statement when the statement was not made by the asset owner of the delegating digital asset,
wherein the association database comprises one or more statements regarding a set of digital assets and associations between the digital assets in the set, wherein the association database is accessible to one or more third parties to verify one or more of the associations between the digital assets in the set.

18. The method of claim 17, wherein determining whether the statement was made by an asset owner of the delegating digital asset comprises determining whether the statement is located in a location that can only be controlled by the asset owner.

19. The method of claim 17, wherein verifying whether the statement is reliable by determining whether the statement was made by an asset owner of the delegating digital asset comprises determining whether the statement is signed using a key that only the asset owner has access to.

20. The method of claim 17, wherein verifying whether the statement is reliable by determining whether the statement was made by an asset owner of the delegating digital asset comprises determining whether the statement is located in a central location associated with the asset owner, wherein the central location comprises one or more statements about one or more other digital assets owned by the asset owner.

21. The method of claim 17, wherein the one or more characteristics comprise one or more of the following:
an ability to receive one or more login credentials associated with the delegating digital asset;
an ability to handle one or more uniform resource locators that the delegating digital asset handles; and
an ability to receive the user's location.

22. A method of associating digital assets, the method comprising:
receiving, via a user interface, a request from a user pertaining to a first digital asset;
querying an association database using an indication of the first digital asset, the indication is based on a statement that was verified to be made by an asset owner of the first digital asset;
receiving from the association database an identification of one or more second digital assets that are associated with the first digital asset, wherein the association database comprises one or more statements, the statements being electronic information regarding a set of digital assets and associations between the digital assets in the set, wherein the statements were verified to be made by one or more asset owners of the set of digital assets based on asset types of the digital assets and permissible locations of the statements, wherein the digital assets are online assets that provide a service or content, and wherein the association database is accessible to one or more third parties to verify one or more of the associations between the digital assets in the set;
generating a recommendation of one or more of the identified second digital assets; and
causing the recommendation to be presented to the user via the user interface.

23. The method of claim 22, wherein receiving a request from a user pertaining to a first digital asset comprises receiving a request comprising an association.

24. The method of claim 22, wherein receiving a request from a user pertaining to a first digital asset comprises performing one or more of the following:
receiving a selection of the first digital asset;
receiving a query pertaining to the first digital asset; and
receiving an identifier associated with the first digital asset.

25. The method of claim 22, generating a recommendation of one or more of the identified second digital assets comprises generating a notification that includes an indication of one or more of the identified second digital assets.

26. The method of claim 22, wherein:
receiving a request from a user pertaining to a first digital asset comprises receiving a query pertaining to the first digital asset via a search engine;
causing the recommendation to be presented to the user via the user interface comprises displaying the recommendation as part of one or more search results of the search engine.

27. The method of claim 22, wherein causing the recommendation to be presented to the user via the user interface comprises causing the processing device to perform one or more of the following:
causing an electronic message comprising the recommendation to be sent to the user;
causing an alert comprising the recommendation to be displayed via the user interface; and causing a text message comprising the recommendation to be sent to the user.

28. A method of associating digital assets, the method comprising:

receiving a request on behalf of a first digital asset to utilize a characteristic belonging to a second digital asset;

generating a query to ascertain whether the first digital asset and the second digital asset are associated such that the first digital asset possesses the characteristic, wherein the query comprises an indication of the first digital asset, an indication of the second digital asset, and an indication of the characteristic;

querying an association database using the generated query, wherein the association database comprises one or more statements, the statements being electronic information regarding a set of digital assets and associations between the digital assets in the set, wherein the statements were verified to be made by one or more asset owners of the set of digital assets based on asset types of the digital assets and permissible locations of the statements, wherein the digital assets are online assets that provide a service or content, and wherein the association database is accessible to one or more third parties to verify one or more of the associations between the digital assets in the set;

receiving, from the association database, an indication of whether the first digital asset and the second digital asset are associated for purposes of the characteristic; and in response to receiving an indication that the first digital asset and the second digital asset are associated, granting the request, wherein the indication is based on one of the statements that was verified to be made by an asset owner of the first digital asset, in response to receiving an indication that the first digital asset and the second digital asset are not associated, denying the request.

29. The method of claim 28, wherein the characteristics comprises one or more of the following:

an ability to receive one or more login credentials associated with the second digital asset;

an ability to handle one or more uniform resource locators that the second digital asset handles; and an ability to receive the user's location.

* * * * *